United States Patent
Loar et al.

(10) Patent No.: US 11,830,019 B2
(45) Date of Patent: *Nov. 28, 2023

(54) SYSTEMS AND METHODS FOR GENERATING VEHICLE WRAPS

(71) Applicant: Wrapmate Inc., Greenwood Village, CO (US)

(72) Inventors: Christopher Loar, Cherry Hills, CO (US); Jacob A. Lozow, Lone Tree, CO (US)

(73) Assignee: WRAPMATE INC., Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,644

(22) Filed: May 2, 2022

(65) Prior Publication Data

US 2023/0079053 A1     Mar. 16, 2023

Related U.S. Application Data

(63) Continuation of application No. 16/533,293, filed on Aug. 6, 2019, now Pat. No. 11,328,495.

(60) Provisional application No. 62/715,064, filed on Aug. 6, 2018.

(51) Int. Cl.
| | |
|---|---|
| *G06F 16/955* | (2019.01) |
| *G06T 15/00* | (2011.01) |
| *G06T 19/20* | (2011.01) |
| *G06Q 30/0201* | (2023.01) |
| *G06F 18/24* | (2023.01) |
| *G06V 20/20* | (2022.01) |

(52) U.S. Cl.
CPC ....... *G06Q 30/0206* (2013.01); *G06F 16/955* (2019.01); *G06F 18/24* (2023.01); *G06T 15/005* (2013.01); *G06T 19/20* (2013.01); *G06V 20/20* (2022.01)

(58) Field of Classification Search
CPC ....... G06T 15/04; G06T 17/205; G06T 19/20; G06Q 30/02–0284; G06Q 30/0251–0271
See application file for complete search history.

(56) References Cited

U.S. PATENT DOCUMENTS

| | | | |
|---|---|---|---|
| 8,095,431 | B1 | 1/2012 | Ahluwalia |
| 9,111,186 | B2 | 8/2015 | Blasinski et al. |
| 10,846,534 | B1 | 11/2020 | Furlan et al. |
| 2003/0004745 | A1 | 1/2003 | Takakura et al. |
| 2010/0106283 | A1 | 4/2010 | Harvill et al. |
| 2013/0050205 | A1 | 2/2013 | Beaver, III et al. |

(Continued)

FOREIGN PATENT DOCUMENTS

WO    2006103629 A1    10/2006

*Primary Examiner* — Diane M Wills
(74) *Attorney, Agent, or Firm* — Fox Rothschild LLP

(57) ABSTRACT

This disclosure provides methods for generating a vehicle wrap design. The method includes: obtaining customer information corresponding to an entity; generating, using the computing device, a vehicle wrap design for covering a vehicle based on the obtained customer information; generating, using the computing device, a three-dimensional rendering of the vehicle, wherein the vehicle wrap design is applied to the three-dimensional rendering of the vehicle; and causing a client device to display the three-dimensional rendering with the applied vehicle wrap.

22 Claims, 9 Drawing Sheets

(56) References Cited

U.S. PATENT DOCUMENTS

| | | | |
|---|---|---|---|
| 2014/0292026 A1* | 10/2014 | Salvaggio, Jr. | ........... F21K 9/64 427/256 |
| 2015/0351477 A1 | 12/2015 | Stahl et al. | |
| 2017/0076335 A1 | 3/2017 | Alexander et al. | |
| 2018/0374274 A1 | 12/2018 | Selvarajan et al. | |

* cited by examiner

SYSTEMS AND METHODS FOR GENERATING VEHICLE WRAPS

CROSS-REFERENCE TO RELATED APPLICATIONS

This application is a continuation of U.S. patent application Ser. No. 16/533,293, filed Aug. 6, 2019, which claims priority under 35 U.S.C. § 119(e) to U.S. Provisional Patent Application No. 62/715,064, filed Aug. 6, 2018, the disclosures of which are incorporated herein by reference in their entireties.

FIELD OF THE INVENTION

This disclosure relates generally to methods and systems for generating a vehicle wrap design.

BACKGROUND OF THE INVENTION

Vehicle wraps are typically used as a means to place advertisements on vehicles, such as cars, vans, trucks, trailers, buses, mac-trucks, semi's, and/or the like. Generally speaking, a vehicle wrap represents a flexible piece of material (e.g., vinyl) upon which a graphical image has been printed or otherwise applied. The vehicle wrap is applied to a vehicle (e.g., a car) to cover the vehicle (either partially or completely) and thereby place the image of the vehicle wrap on a portion or entire exterior of the vehicle.

Generating custom wraps in real-time and on-demand may present challenges. For example, it is oftentimes a challenge to design a vehicle wrap that properly covers the three-dimensional contours of a vehicle. Additionally, conventional vehicle wrap systems print a vehicle wrap without being able to generate a real-life and/or real-time mock-up of the design that is directly applied to a three-dimensional model of a vehicle.

It is with these problems, among others, that aspects of the present disclosure were conceived.

SUMMARY OF THE INVENTION

In one aspect, this disclosure provides a method for generating a vehicle wrap design. The method comprises: (a) obtaining customer information corresponding to an entity; (b) generating, using the computing device, a vehicle wrap design for covering a vehicle based on the obtained customer information; (c) generating, using the computing device, a three-dimensional rendering of the vehicle, wherein the vehicle wrap design is applied to the three-dimensional rendering of the vehicle; and (d) causing a client device to display the three-dimensional rendering with the applied vehicle wrap.

In some embodiments, generating the vehicle wrap design and the three-dimensional rendering of vehicle is performed at a server device, and the method further comprises transmitting the vehicle wrap design or the three-dimensional rendering of vehicle to the client device.

In some embodiments, the customer information can be obtained from a website, and the customer information comprises web content associated with the entity. The customer information may include company name, contact information, logo, URL, trademark, or slogan.

In some embodiments, the vehicle can be identified based on an industry classification code associated with the entity or identified from an image captured at the client device.

In some embodiments, the vehicle wrap design comprises unique contact information for assessing the effectiveness of the vehicle wrap design. The unique contact information may be different from the contact information of the entity. In some embodiments, the method further comprises assessing the effectiveness of the vehicle wrap design based on the number of contacts made through the unique contact information over a predetermined period of time (e.g., one day, one week, one month, three months, six months, one year).

In some embodiments, generating the vehicle wrap design comprises: determining whether the web content includes a background; and when the web content includes a background, determine if an image is identifiable from the web content; and when an image is identifiable, integrate the image within the background, and verify that a contrast ratio between the background and the image is at an acceptable threshold.

In some embodiments, the method further comprises delivering the vehicle wrap design to the entity via direct mail, email, or digital marketing.

In some embodiments, the method further comprises receiving user interactions as the client device while the three-dimensional rendering with the applied vehicle wrap is displayed at the client device; and modifying the vehicle wrap design based on the user interactions.

In some embodiments, causing the three-dimensional rendering with the applied vehicle wrap to be displayed at a client device comprises: while capturing an image at the client device, superimposing the vehicle wrap design over at least a portion of the image.

In another aspect, this disclosure additionally provides a system for generating a vehicle wrap design. The system comprises at least one computing device to: (a) obtain customer information corresponding to an entity; (2) based on the web content, generate a vehicle wrap design for covering a vehicle; (3) generate a three-dimensional rendering of the vehicle, wherein the vehicle wrap design is applied to the three-dimensional rendering of the vehicle; and (4) cause a client device to display the three-dimensional rendering with the applied vehicle wrap.

In some embodiments, the customer information is obtained from a website, and the customer information comprises web content associated with the entity. The customer information may include company name, contact information, logo, URL, trademark, or slogan.

In some embodiments, the vehicle can be identified based on an industry classification code associated with the entity or identified from an image captured at the client device.

In some embodiments, the vehicle wrap design comprises unique contact information for assessing the effectiveness of the vehicle wrap design. The unique contact information may be different from the contact information of the entity. In some embodiments, the method further comprises assessing the effectiveness of the vehicle wrap design based on the number of contacts made through the unique contact information over a predetermined period of time (e.g., one day, one week, one month, three months, six months, one year).

In some embodiments, generating the vehicle wrap design comprises: determining whether the web content includes a background; and when the web content includes a background, determine if an image is identifiable from the web content; and when an image is identifiable, integrate the image within the background; and verify that a contrast ratio between the background and the image is at an acceptable threshold.

In some embodiments, the method further comprises delivering the vehicle wrap design to the entity via direct mail, email, or digital marketing.

In some embodiments, the at least one processing device is further configured to: receiving user interactions as the client device while the three-dimensional rendering with the applied vehicle wrap is displayed at the client device; and modifying the vehicle wrap design based on the user interactions.

In some embodiments, causing the three-dimensional rendering with the applied vehicle wrap to be displayed at a client device comprises: while capturing an image at the client device, superimposing the vehicle wrap design over at least a portion of the image.

In yet another aspect, this disclosure further provides a non-transitory computer-readable medium encoded with instructions. The instructions, executable by one or more processing devices, include: (a) obtaining from a website web content corresponding to an entity; (b) based on the web content, generating a vehicle wrap design for covering a vehicle; (c) generating a three-dimensional rendering of the vehicle, wherein the vehicle wrap design is applied to the three-dimensional rendering of the vehicle; and (d) causing the three-dimensional rendering with the applied vehicle wrap to be displayed at a client device.

In some embodiments, the vehicle is identified based on an industry classification code associated with the entity or identified from an image captured at the client device.

In some embodiments, generating the vehicle wrap design comprises: determining whether the web content includes a background; and when the web content includes a background: determine if an image is identifiable from the web content; and when an image is identifiable: integrate the image within the background; and verify that a contrast ratio between the background and the image is at an acceptable threshold.

In some embodiments, the non-transitory computer-readable medium further comprises: receiving user interactions as the client device while the three-dimensional rendering with the applied vehicle wrap is displayed at the client device; and modifying the vehicle wrap design based on the user interactions. In some embodiments, causing the three-dimensional rendering with the applied vehicle wrap to be displayed at a client device comprises: while capturing an image at the client device, superimposing the vehicle wrap design over at least a portion of the image.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings, the like reference characters refer to the same parts throughout the different views. The drawings depict only typical embodiments of the present disclosure and, therefore, are not to be considered limiting in scope.

DETAILED DESCRIPTION OF THE INVENTION

This disclosure provides methods and systems for generating vehicle wrap designs. The methods and systems may implement various mechanisms, including a system initiated path and a user-initiated path.

I. System Initiated Wrap Generation

Aspects of the present disclosure involve a system that automatically generates, in real-time, vehicle wrap designs, for eventual application to cars, vans, trucks, trailers, buses, mac-trucks, semi's, and/or the like (collectively referred to as "vehicles"). In various aspects, the system obtains or otherwise accesses various content for use in generating a vehicle wrap design. For example, the system may retrieve various content from a database (e.g., an internal database, a third-party database) that contains the content collected from various sources (e.g., web sites, Yellowbook, vendors). In one example, the system captures web-related content, such as images, colors, logos, slogan, trademark, videos (or other multimedia), and other related data associated with an entity interested in wrapping a vehicle with a vehicle wrap design. Stated differently, an entity interested in generating a vehicle wrap or an entity identified by the system as a potential customer may have a web presence involving a series of web pages and/or other web-related content accessible via a web browser. The disclosed system may automatically access (e.g., scrape a web page) the web content to identify content associated with the entity that may be used in generating a customized vehicle wrap design. Thus, based on the captured web-based content, the system automatically generates a vehicle wrap design and a three-dimensional ("3-D") model of a vehicle to which the generated vehicle wrap has been applied.

In other aspects, the generated vehicle wrap may be encapsulated into a message, data package, e-mail, and/or the like (generally referred to as Package) and automatically transmitted for presentation to a user. The system may detect or otherwise capture metadata indicating whether a user (e.g., a representative of the interested entity) accesses and/or otherwise engages the vehicle wrap design and/or the 3-D model of the Package.

The following disclosure uses vehicle wraps to illustrate the inventive concepts of the present disclosure. The disclosure, however, is not so limited and may be applied to various other technologies outside of vehicles, such as or within trade shows and trade show software applications, billboards, bus benches, signage, and/or other products capable of being custom-designed to display specific logos, colors, and images corresponding to specific entities before the product is actually purchased and produced.

Figure 1:
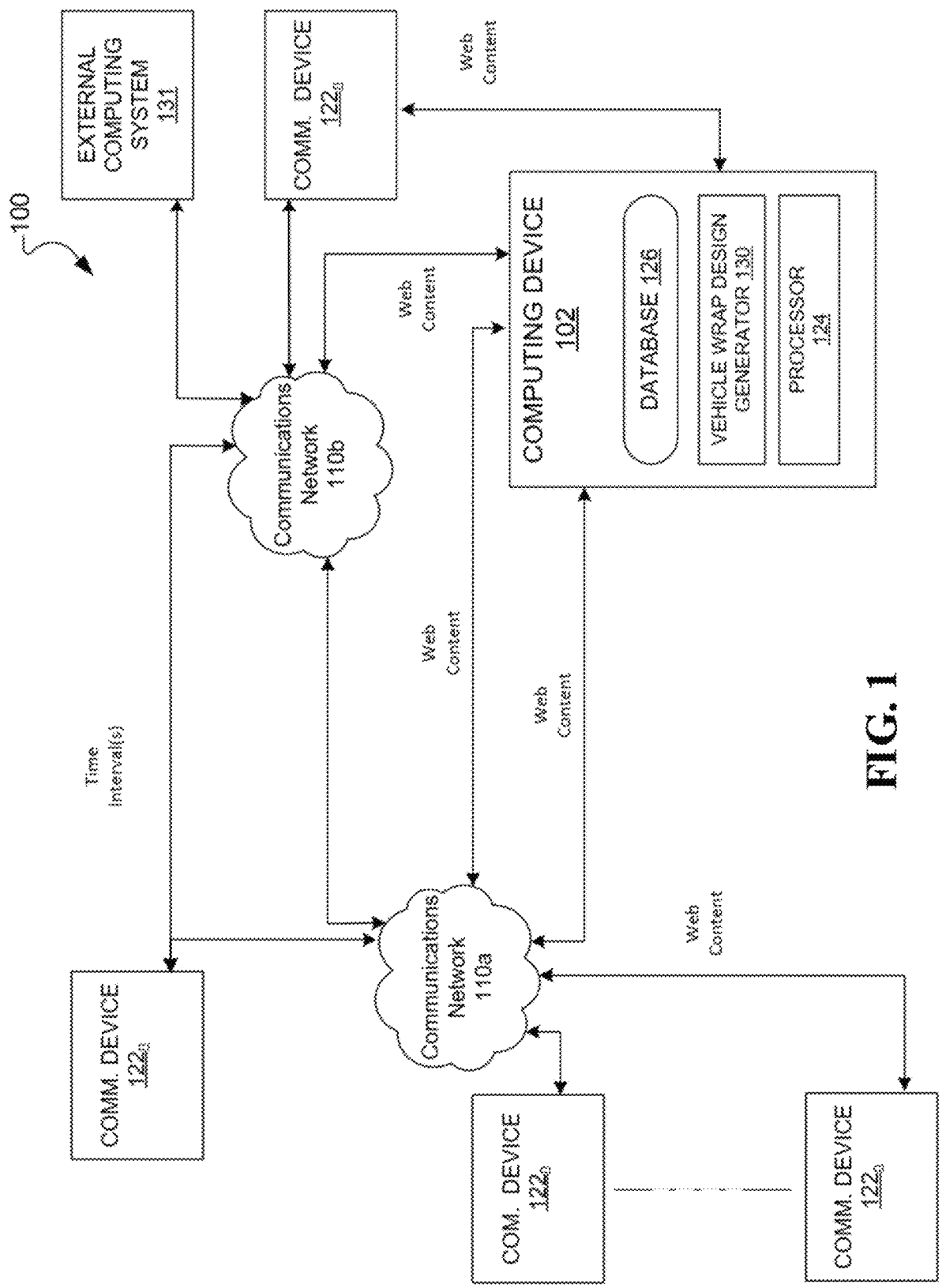
FIG. 1 is an example computing environment for generating vehicle wraps, according to aspects of the present disclosure.

FIG. 1 provides an illustration of an implementation of a computing system or computing environment 100 configured to generate vehicle wraps and/or three-dimensional models of a vehicle with a vehicle wrap applied, according to aspects of the present disclosure. As illustrated, FIG. 1 includes various computing devices communicating through one or more networks 110a, 110b. The one or more networks may be an IP-based telecommunications network, the Internet, an intranet, a local area network, a local wireless network, a content distribution network, or any other type of communications network, as well as combinations of networks. For example, in one particular embodiment, the networks 110a and 110b may be a telecommunications network including fiber-optic paths between various network elements, such as servers, switches, routers, and/or other optical telecommunications network devices that interconnect to enable receiving and transmitting of information between the various elements as well as users of the network.

The computing environment 100 includes a computing device 102 that is in communication with communication devices ($122_1$, $122_2$, ..., $122_n$) located at one or more geographic locations. The computing device 102, may be a processing device that functionally connects or otherwise communicates (e.g., using the one or more networks 110a, 100b) with communication devices ($122_1$, $122_2$, ..., $122_n$) included within the computing environment 100. The communication devices ($122_1$, $122_2$, ..., $122_n$) may be any of, or any combination of, a personal computer; handheld computer; mobile phone; digital assistant; smartphone; server; application; and the like. In one embodiment, each of the communication devices ($122_1$, $122_2$, ..., $122_n$) may include a processor-based platform that operates on any suitable operating system, such as Microsoft® Windows®, Linux®, Android, and/or the like that is capable of executing software processes, software, applications, etc. The communication devices ($122_1$, $122_2$, ..., $122_n$) devices may also include a communication system to communicate with the various components of the computing environment 100 via a wireline and/or wireless communications, such as networks 110a, 100b.

The computing device 102 includes a processor 124, a database 126, and a vehicle wrap generator 130. The processor 124 may receive or otherwise obtain various pieces of content from a webpage (or other web content) for use in generating a vehicle wrap. In particular, the processor 124 executes a process that automatically collects and/or scrapes information from various web content (e.g., web pages) associated with a particular entity interested in generating a vehicle wrap. Thus, the system may access any textual, visual, or aural content that is encountered as part of a user experience on websites, web pages, and/or the Internet, which may include—among other things—text, images, sounds, videos, and animations corresponding to or otherwise associated with the entity, the entity's brand and the like. The database 126 may be a database, data store, storage, and/or the like, for storing data involved in generating vehicle wraps for vehicles. In one specific example, the database 126 may any of the content extracted from webpages and used to generate a vehicle wrap.

The vehicle wrap generator 126 provides a mechanism that automatically generates vehicle wraps designs based on the content collected and obtained by the processor 124. In particular, the vehicle wrap generator 126 may provide a mechanism, process, and/or application, which, when executed, uses various artificial intelligence algorithms to generate a vehicle wrap customized based on the applicable entity's brand.

Figure 2:
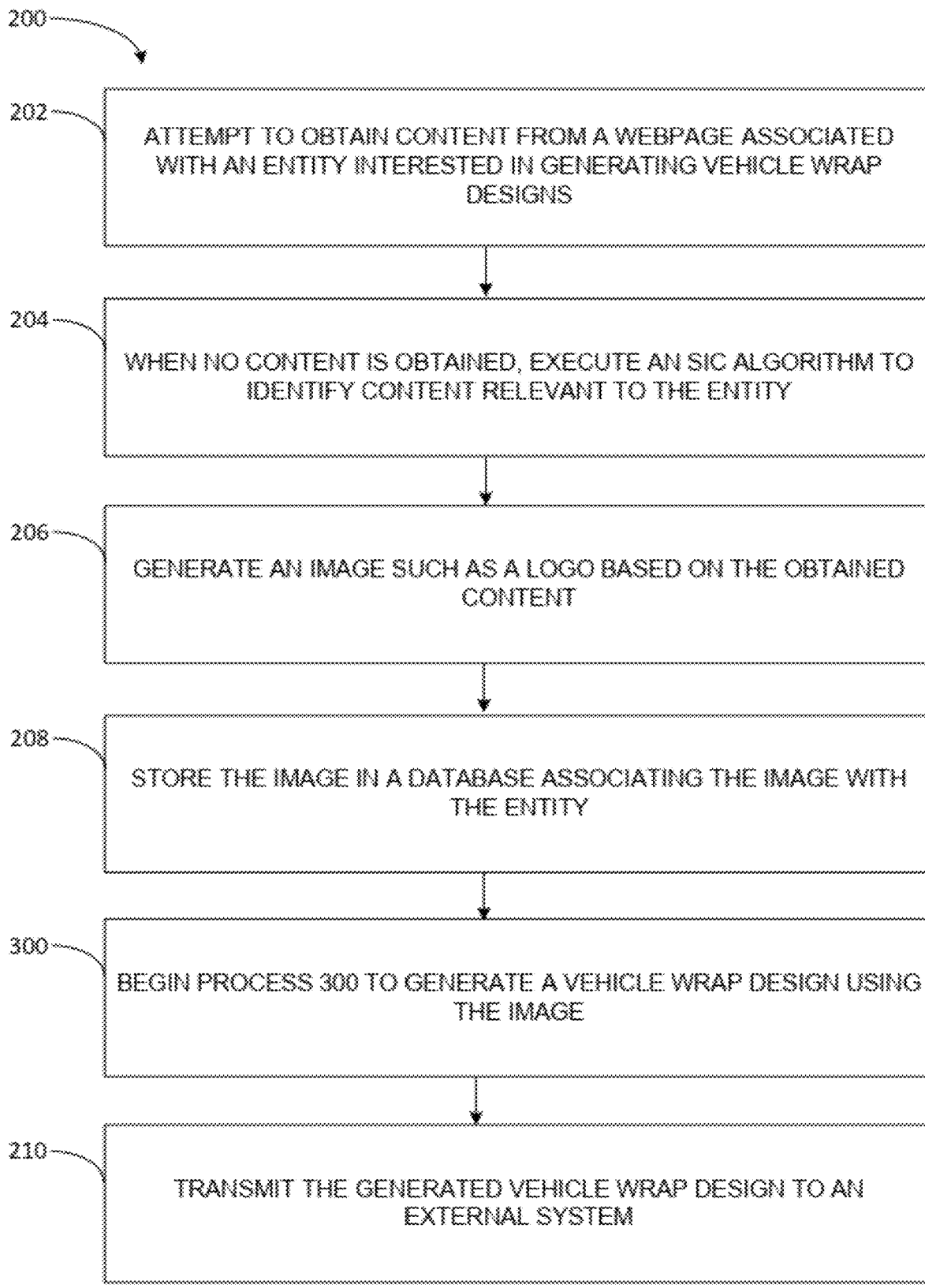
FIG. 2 is a flow chart or process for obtaining data for use in generating vehicle wraps, according to aspects of the present disclosure.

Referring now to FIG. 2 and with reference to FIG. 1, a process 200 for determining and/or otherwise obtaining data for use in generating vehicle wraps is provided. As illustrated, process 200 begins at step 202, with obtaining content from a webpage (or other web content source) associated with an entity, such as a business or corporation interested in generating vehicle wraps for various vehicles. Stated differently, the system automatically and systematically gathers information from the Internet (e.g., from a webpage or other web-accessible content) and stores the data into a central database or other repository. In one specific embodiment and with reference to FIG. 1, a user interacting with one or more of the communication devices ($122_1$, $122_2$, ..., $122_n$) may provide a location to web content for a particular entity, such as a uniform resource locator ("URL") to initiate access and/or identification of the content.

The processor 124 may receive or otherwise obtain an indication of a webpage, such as a URL provided by a user. Based on the URL, a stream of data, such as an HTML stream may be obtained from the webpage associated with the URL. The captured data stream (e.g., the HTML stream) is loaded into a browser, which renders the page and thereby generates run-time data that may be analyzed to determine the webpage's layout. Using the layout information, areas containing information of interest are extracted from the HTML stream, and the data is associated with the particular entity as an "asset." Such information may include text, images, sounds, videos, and animations, associated with the particular entity. Step 202 can be performed continuously so as to provides updates to existing data and add new data of items newly found on the web. Additionally, step 202 can be executed multiple times and for as many URLs associated with the entity as desired.

In one specific example, the various elements of the web content may be analyzed to determine whether a background image (or multiple images) or other background content is identifiable. For example, in the context of HTML, the processor 124 may access element tags such as the image tags src, SVG tag, and/or other tags that have a background image style attribute. In other examples, the processor 124 may look for elements that contain 'logo' in their id or class name (case insensitive) and check if there is a background, the image's src attr or one of the forms of SVGs. In yet another example, the processor 125 may identify images that contain 'logo' in their src attribute (case insensitive) or a background that contains 'logo' in its name. In yet another example, the processor 124 may check for a favicon (Some of it might have 256×256 dimension). The processor 124 may identify colors, fonts, and other content associated with the web content by accessing elements associated with the colors and fonts of the content in a similar manner Referring again to FIG. 2, at step 204, in the event that no information is scrapped or otherwise obtained from the website, a Standard Industrial Classification (SIC) algorithm is executed to obtain relevant content associated with the entity of interest. More specifically, various websites providing information corresponding to the entity (e.g., the website for the US Census Bureau) is scrapped to determine what classification of business the entity is initially in, which enables the system to predict or otherwise generate designs associated with the entity, in the event the entity has no pre-defined or pre-existing logo available. For example, assuming the entity where a professional sports organization and no known logo for the organization is available. The SIC algorithm is executed and accesses various websites to capture information and data (e.g., images, text, multimedia) that the sports organization is associated with basketball. Thus, the SIC algorithm captures basketball-related content (e.g., multiple images, colors, patterns), based on the determined background colors, fonts, etc., of the various websites. Accordingly, an image(s) or asset is generated from the determined background, colors, fonts, etc., at step 206.

Referring again to FIG. 2, at step 208, the generated image or asset is stored in the database 126 and associated with the entity. Once stored, the content may be used to generate a vehicle wrap design for the entity (illustrated at 300).

Figure 3A:
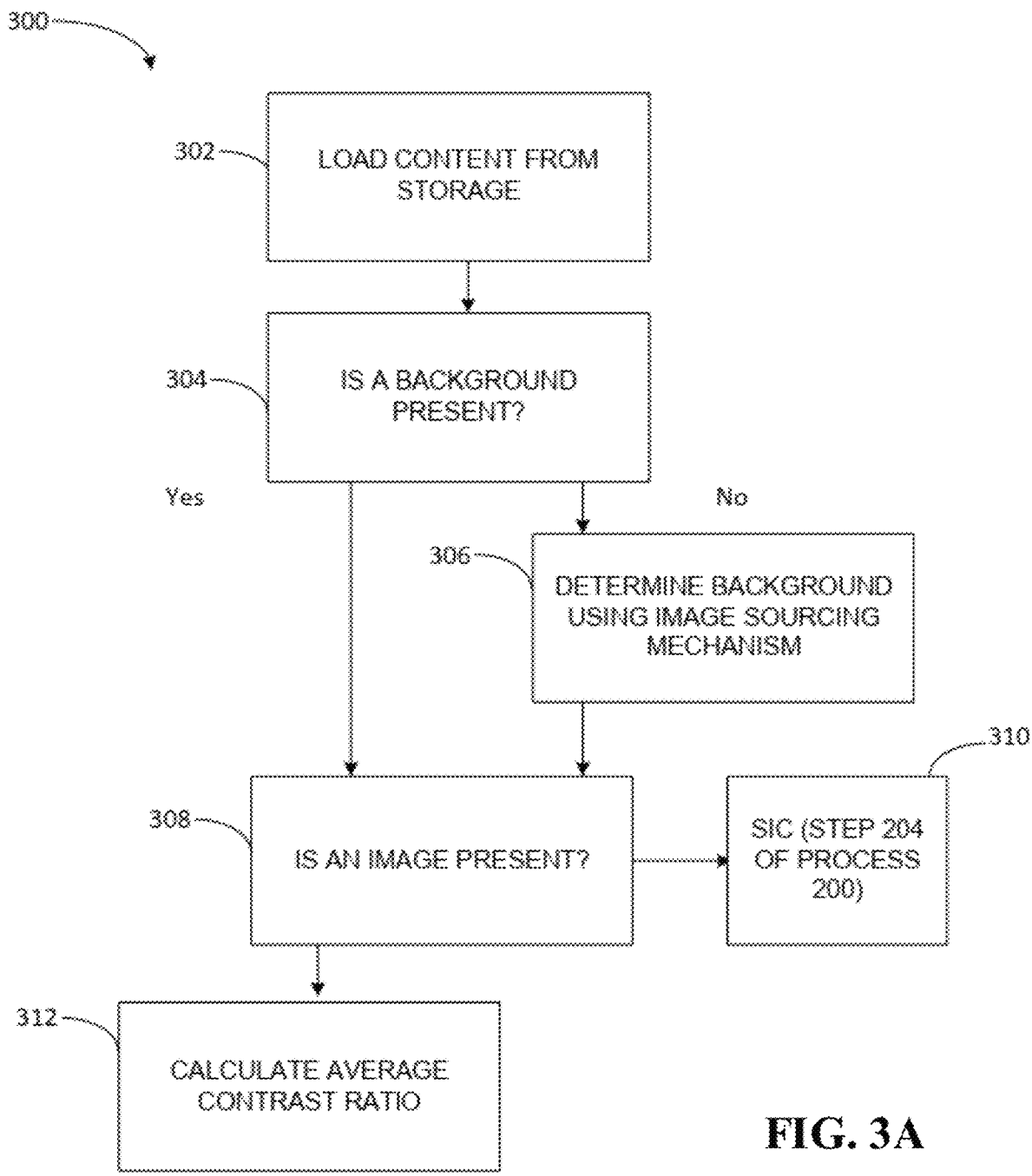
FIG. 3A is a flow chart or process for generating vehicle wraps, according to aspects of the present disclosure.
Figure 3B:
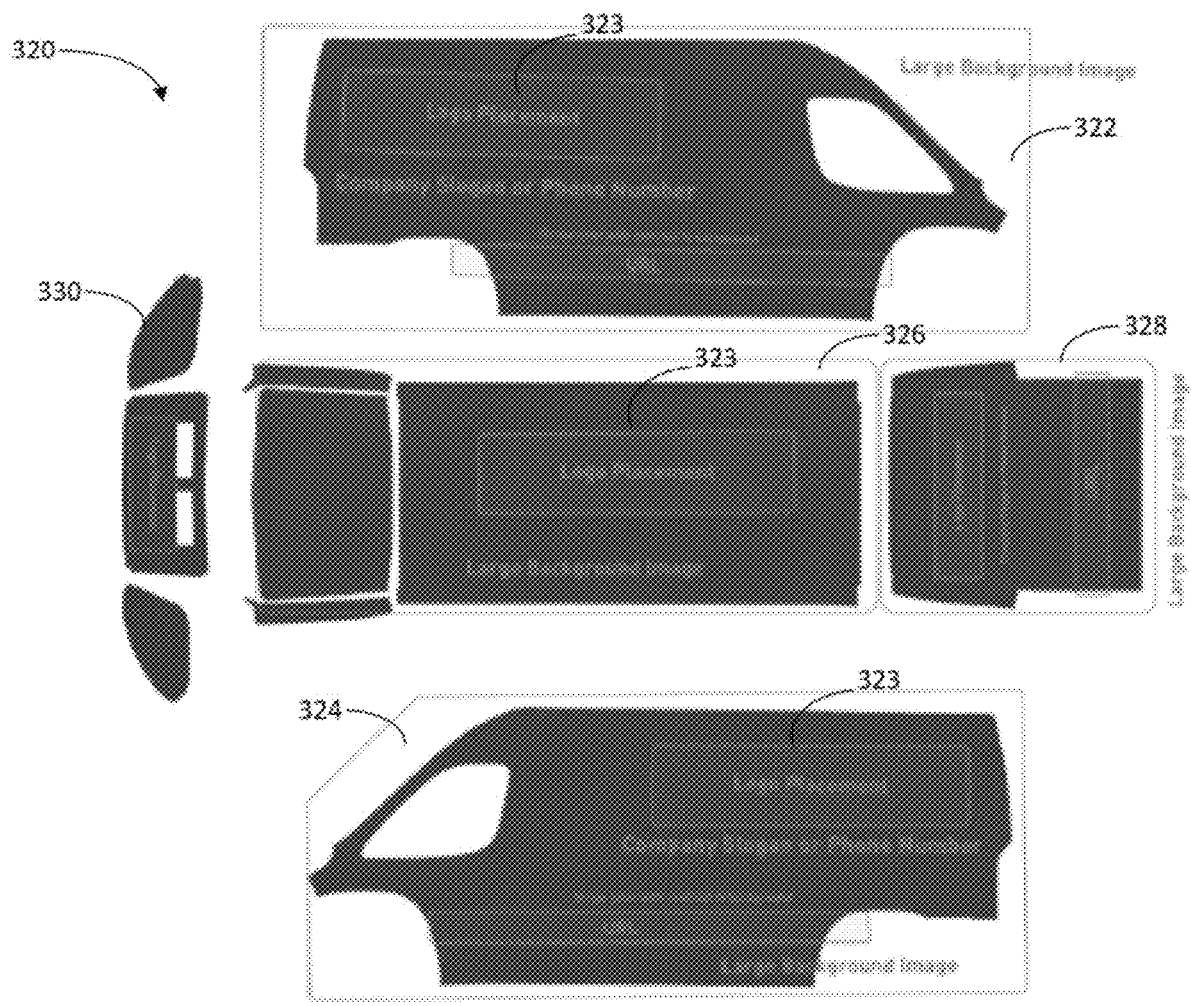
FIG. 3B is an example of a vehicle wrap, according to aspects of the present disclosure.

Referring now to FIG. 3A and with reference to FIG. 1, a process 300 for designing a vehicle wrap based on captured data (e.g., from process 200) is provided. Process 300 begins with loading content (e.g., an asset) from storage. Referring to FIG. 1, the assets are loaded from the database 126. At step 302, a design layout is generated using the identified assets corresponding to the entity and a pre-defined template of a vehicle. FIG. 3B illustrates an example design layout 320 that may be generated system according to one embodiment. As illustrated, the design layout 320 (in the illustrated embodiment, a van based on the pre-defined template) includes a side portion 322, a side portion 324, a top portion 326, a rear portion 328, and a front portion 330, all of which collectively make up the design layout 320. The design is configured in the form a van, which was based on a pre-defined template shaped like a van (other templates of other vehicles, such as cars, buses, trucks may be used). Thus, as illustrated, a logo 332 or other identified assets may be applied to various portions of the vehicle.

Referring again to FIG. 3A, at step 304, it is determined whether a background is present. In the event no background is present, the system identifies a default color that corresponds to the asset. If a background is available, the process moves to step 306 to determine if an image or logo is available from the asset. If no image or logo is present, the process advances to step 210 to use SIC and determine the logo. More specifically, if no image or logo is available and/or identifiable, the process moves to step 308 to find an appropriate image using keywords in conjunction with an image sourcing mechanism, such as Getty Images.

Once a log has been identified, at step 312, the system ensures that any identified logo is easily identifiable from the logo. For example, in one specific example, a calculation is made to determine the contrast ratio between the logo edges and a particular area of the applicable background. In such a scenario, at step 314, it is determined whether the contrast ratio is greater than 4.5. At 316, when the contrast ratio is greater than 4.5, the system determines that the logo will be clearly visible to a user; thus, the system generates an indication that an appropriate location for placing the logo has been identified. At 318, the logo is applied (e.g., integrated or embedded) into the background. At 318, a series of personalizations may be determined for the phone/slogan and corresponding URL.

At 320, a 3-D model or rendering of a vehicle is generated, wherein the 3D model includes an application of the vehicle wrap design. Stated differently, the 3-D model may be generated with the vehicle wrap design applied. In one specific embodiment and with reference to FIG. 1, to determine the type of vehicle the wrap should be applied, a user interacting with one or more of the communication devices ($122_1$, $122_2$, . . . , $122_n$) may identify a specific type of vehicle on which the generated vehicle design may be applied. Thus, they may be applied to the vehicle identified by the user. In another example, the user may use the client device to capture an image of a vehicle (or other product on which a wrap may be projected) such as a car and transmit the image to the computing device 102. In such a scenario, the processor 124 may process the image and determine that the vehicle intended to be wrapped is a car.

Referring again to FIG. 2, at 222, the generated 3-D model and vehicle wrap may be encapsulated into a distributable data Package for presentation to users. For example, referring to FIG. 1, the computing device 102 may transmit the generated 3-D model with the applied vehicle wrap in the form of a Package to one or more of the communication devices ($122_1$, $122_2$, . . . , $122_n$) for access by a user. Upon access by a user, the Package may transmit metadata to the computing device 102, indicating that a user accessed the Package and/or the 3-D model with the applied vehicle wrap design. In the event that the user accessed the Package, the computing device 102 may transmit an indication to a vehicle wrap computing center (illustrated in FIG. 1 as External Computing system 131) for order fulfillment. In the event that a user does not engage the Package, the system automatically re-adjusts the generated 3-D model with the applied vehicle wrap to generate another vehicle wrap that may be more of interest.

In one specific example, the Package may be incorporated into a web page and made available as web content via a URL. Thus, referring to FIG. 1, the computing device 102 may transmit a URL to the one or more of the communication devices ($122_1$, $122_2$, . . . , $122_n$) for access by a user. The user may then access the URL to obtain access to the 3-D model with the applied vehicle wrap design. The webpage may also include a selectable component for enabling the user to indicate that he/she would like to pursue the vehicle wrap design. In the event that a user indicates that he/she would like to pursue the vehicle wrap design, the system sends an indication to a vehicle wrap computing center (illustrated in FIG. 1 as External Computing system 131) for order fulfillment.

In another example, the generated vehicle wrap design may be augmented (e.g., superimposed) on or within various media captured by the one or more communication devices the communication devices ($122_1$, $122_2$, . . . , $122_n$). For example, the vehicle wrap design may be augmented on photos captured by the communication devices ($122_1$, $122_2$, . . . , $122_n$) in real-time. In one specific example, a three-dimensional object or feature of a real-world object may be captured in a camera view of one of the communication devices ($122_1$, $122_2$, . . . , $122_n$). During the capturing, a generated vehicle wrap may be attached, superimposed, or otherwise displayed on the three-dimensional object or feature of the real-world object, thereby generating an augmented representation of the three-dimensional object or feature of the real-world object at the of the communication devices ($122_1$, $122_2$, . . . , $122_n$). The augmentation may occur in response to user input received at one of the communication devices ($122_1$, $122_2$, . . . , $122_n$).

Figure 4:
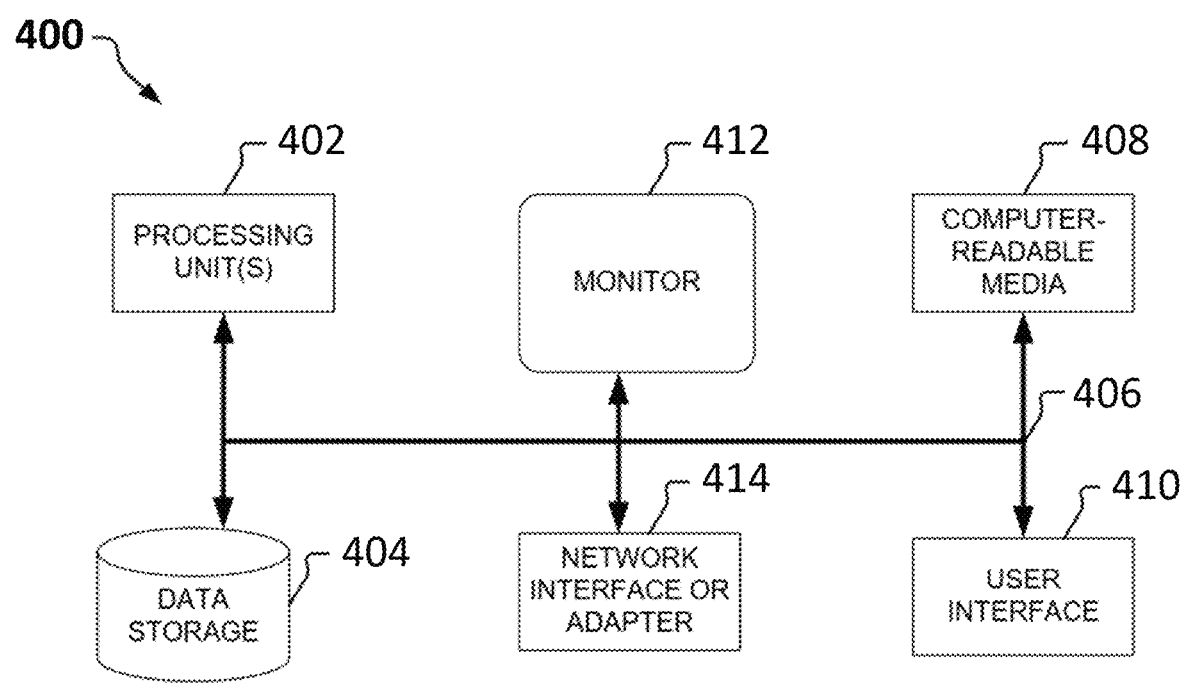
FIG. 4 is a diagram of a computing system specifically implemented for generating vehicle wraps, according to aspects of the present disclosure, according to aspects of the present disclosure.

FIG. 4 illustrates an example of a suitable computing and networking environment 400 that may be used to implement various aspects of the present disclosure described in FIG. 1-4. As illustrated, the computing and networking environment 400 includes a general-purpose computing device 400, although it is contemplated that the networking environment 400 may include one or more other computing systems, such as personal computers, server computers, hand-held or laptop devices, tablet devices, multiprocessor systems, microprocessor-based systems, set-top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other media that may be used to store the desired information/data and which may be accessed by the computer 400.

Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory, such as read-only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules, and other data for the computer 400.

A user may enter commands and information through a user interface 410 or other input devices such as a tablet, electronic digitizer, a microphone, keyboard, and/or pointing device, commonly referred to as a mouse, trackball or touchpad. Other input devices may include a joystick, gamepad, satellite dish, scanner, or the like. Additionally, voice inputs, gesture inputs (e.g., via hands or fingers), or other natural user interfaces may also be used with the appropriate input devices, such as a microphone, camera, tablet, touchpad, glove, or other sensors. These and other input devices are often connected to the processing unit 402 through a user interface 410 that is coupled to the system bus 406, but may be connected by other interface and bus structures, such as a parallel port, game port or a universal serial bus (USB). A monitor 412 or other types of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets, and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanisms. A wireless networking component including an interface and antenna may be coupled through a suitable device such as an access point or peer computer to a network. In a networked environment, program modules depicted relative to the computer 400, or portions thereof, may be stored in the remote memory storage device.

Figure 5:
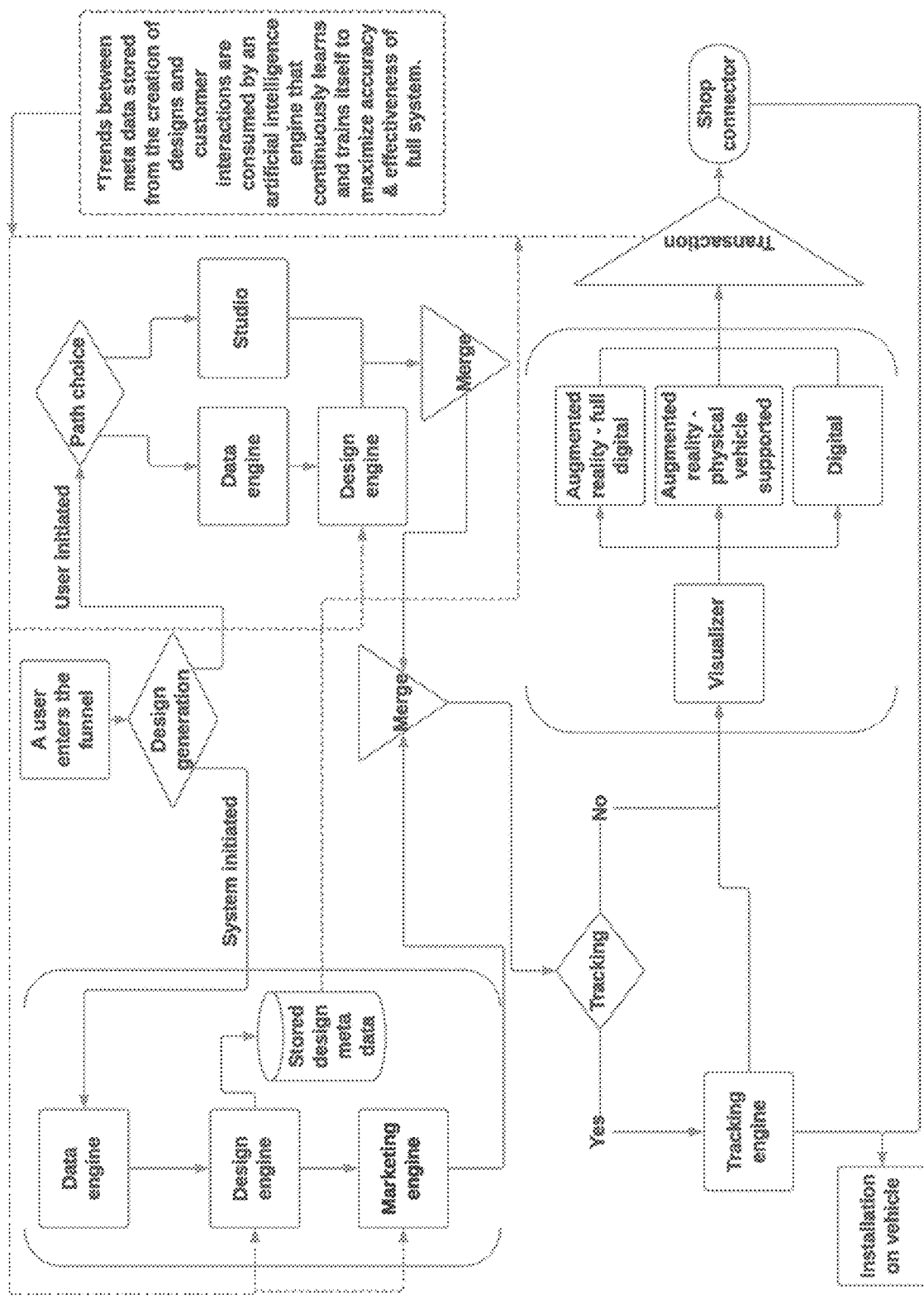
FIG. 5 shows example workflows of a system-initiated wrap design and a user-initiated wrap design.

Referring now to FIG. 5, in some embodiments of the present invention, the system initiated workflow of wrap design can be broken out into three primary components, the Data Engine, the Design Engine, and the Marketing Engine. In some embodiments, the workflow is implemented to automatically identify potential customers without them taking any action, dynamically create a graphic design unique to them, and then share that graphic with the intended recipient all without any human interaction.

A. Data Engine

The Data Engine is capable of identifying and capturing all marketing assets (e.g., customer information) possible to render a design for a company in a later workflow. The Data Engine contains a list of potential customers generated from an internal database. Potential customer information may include, without limitation, business name, company contact name, company contact email, company URL, and company industry classification code. The system will identify each company URL and access their website. Once on a company website, the system utilizes a variety of techniques to identify relevant materials that may include, without limitation, colors, fonts, logos, backgrounds, slogans, physical addresses, and phone numbers. If assets are identified they are classified and stored within a database, and if the relevant materials are not found, the entry associated with that company is flagged. After asset acquisition and/or storage, this workflow is complete.

B. Design Engine

The Design Engine is capable of using all stored assets as well as create new ones to dynamically render a unique design for a specific potential customer. Initially, this workflow queries all assets from the Data Engine. In one example, a potential first step would be to utilize a company industry classification code to identify one or more specific vehicle types (e.g., cars, vans, trucks, trailers, buses, mactrucks, semi's) used by the particular industry. The system may match one vehicle type with many industry classification codes, such that if a match is identified, a wrap design can be placed on a defined vehicle type. If no match is identified, the wrap design is rendered on a pre-defined generic one.

Once a vehicle type has been identified, the corresponding layout is queried, and assets are prepared for placement on it. An initial first asset may be background. The system has a number of rules that it will apply to the classified background to determine its suitableness for use in a wrap design. In the cases of noncompliance with these rules, the system employs a preprocessing routine (e.g., color change, cropping, rotating, scaling, smoothing, masking, merging, filtering, flattening) to resolve the noncompliance. For example, the system may utilize a variety of computer vision techniques to determine if there is any depiction of human in the background. If the system detects the presence of a human in the background, it may apply a blurring effect or masking to the background image as a whole, thus rendering the human as an indistinguishable shape. The system will cycle treatment verification and treatment application until the image is verified. If a background image has not been identified, the system will query a variety of third-party platforms to identify and treat an acceptable one. After an image is identified through either workflow, it can be applied to the template, and the workflow progresses.

Each layout introduces the possibility for the inclusion of a variety of shapes and textual input. Each additional layer above the background may be assessed for the need to include an underbase. An underbase is a high contrast shape placed between the background and the specific design element. The inclusion of an underbase may be triggered when the contrast ratio of attributes of the background and additional design elements does not meet a predetermined ratio. The color of the underbase is selected dynamically to maximize contrast. The system may apply an underbase between any two design elements. In addition, the system can, for example, change font style, size, and color of any design element. Upon the completion of all element optimization, each is placed on the layout following a defined template, and the completed design is saved for future utilization.

C. Marketing Engine

The Marketing Engine is capable of distributing created wrap designs to the intended recipients/customers. The Marketing Engine first queries both the appropriate design and the corresponding business record. Once all data is available, the system determines a marketing path (e.g., direct mail, email, or digital marketing). A recipient may receive any one or combination of direct mail, email, or digital marketing campaigns, each containing their unique design. A corresponding web asset for each design is created such that the recipient may access it to view their advertised design in greater detail and ultimately move forward with transacting on that design. To this point, the recipient of the marketing materials containing a wrap design has not played a part in the workflow, and the next several steps require their input.

The design of each piece of marketing materials is dynamic to the rendered design. Each template has elements such as backgrounds, colors, and fonts that are all dynamically selected by a variety of techniques for best fitment with the rendered design. For direct marketing campaigns, the template with all materials selected and placed on it is staged to be printed and mailed to a physical address associated with the recipient. The direct mail piece will have a unique URL on it, directing the recipient to their unique web asset. For email campaigns, the template with all materials is created and is staged to be sent to the intended recipient. The email has a section that, if clicked on by the user, will direct them to their unique web asset. For digital marketing campaigns, the rendered design can be placed on the template associated with the specific digital marketing channel asset, including associating the unique URL. The campaign is then staged to be sent to the intended recipient. Staged campaigns are scheduled for delivery and ultimately sent. The engine then holds awaiting recipient feedback in the form of accessing the unique URL. If the recipient utilizes the URL and interacts with the online resource, they are taken out of the Marketing Engine, and otherwise, the engine attempts to contact them a defined number of times again with a predetermined interval. If the recipient does not respond after a defined number of outreaches, they are taken out of the Marketing Engine.

II. User-Initiated Wrap Design

Figure 6B:
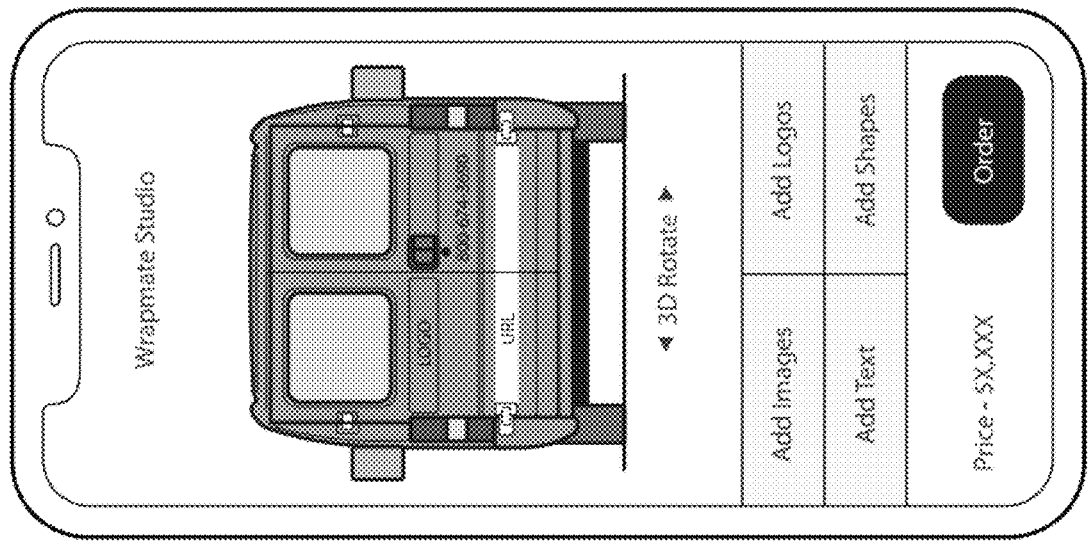
FIGS. 6A and 6B (collectively "FIG. 6") show an example of a studio, implemented on a user device, for providing an interactive interface for a user to generate custom wrap design and to place an order of wrap design.
Figure 6A:
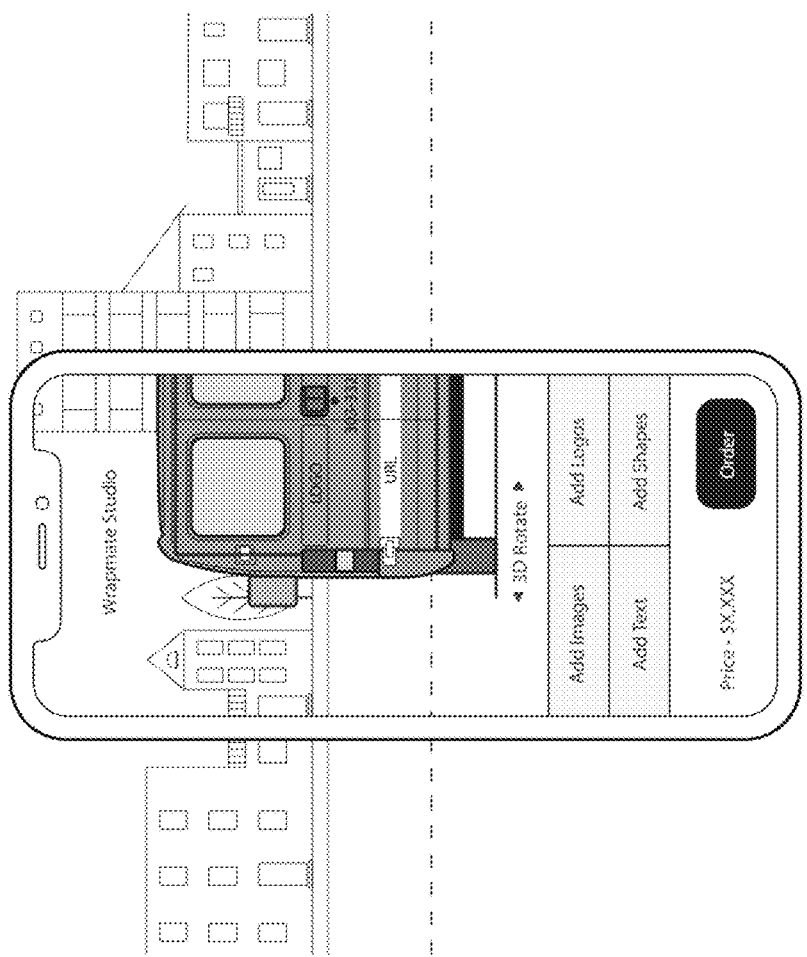

The user-initiated path has two possible subpaths. A user may elect to provide a URL themselves, which would then initiate both the Data Engine and the Design Engine workflow. The other user path involves them creating their own unique design in the studio, as shown in FIGS. 6A and 6B. The studio is a full visualizer that allows users to select a blank vehicle rendering and identify or create a variety of design assets, including images, shapes, text, and numerics and layer them throughout the selected vehicle. This design elements dynamically adjust as a user moves them around the layout such that they maintain the expected shape and coverage over geometrically sophisticated components of the vehicle. The user is provided with tools to mirror designs from one side of the vehicle to the other as well as others. Once the user-initiated design has been created in either path, they are merged and sent to the next phase of the workflow.

Tracking

After a design has been created, a user can opt into the wrap effectiveness tracking engine. Upon opting in elements of the design are altered such that they can be utilized later on to track engagement with the wrap. For example, a unique phone number could replace the general business number on the wrap, such that it is the only place the unique number is used. All inbound calls to the unique number could then be attributed to the wrap and can be logged and combined with additional data, such as the vehicle's route for the day, traffic conditions, weather, and other to provide a complete picture of the deployment within a dashboard created for that user. This same methodology can be used for a custom business URL on the wrap.

Visualizing

A user will have the ability to view their designs in different augmented reality experiences, including a full digital mode and a physical vehicle supported mode. The full digital mode is reliant upon only a flat physical space within the field of view of the user device, and the physical vehicle supported mode is reliant on a flat space with a vehicle on it within the field of view of the user device.

Full Digital Mode

Figure 7A:
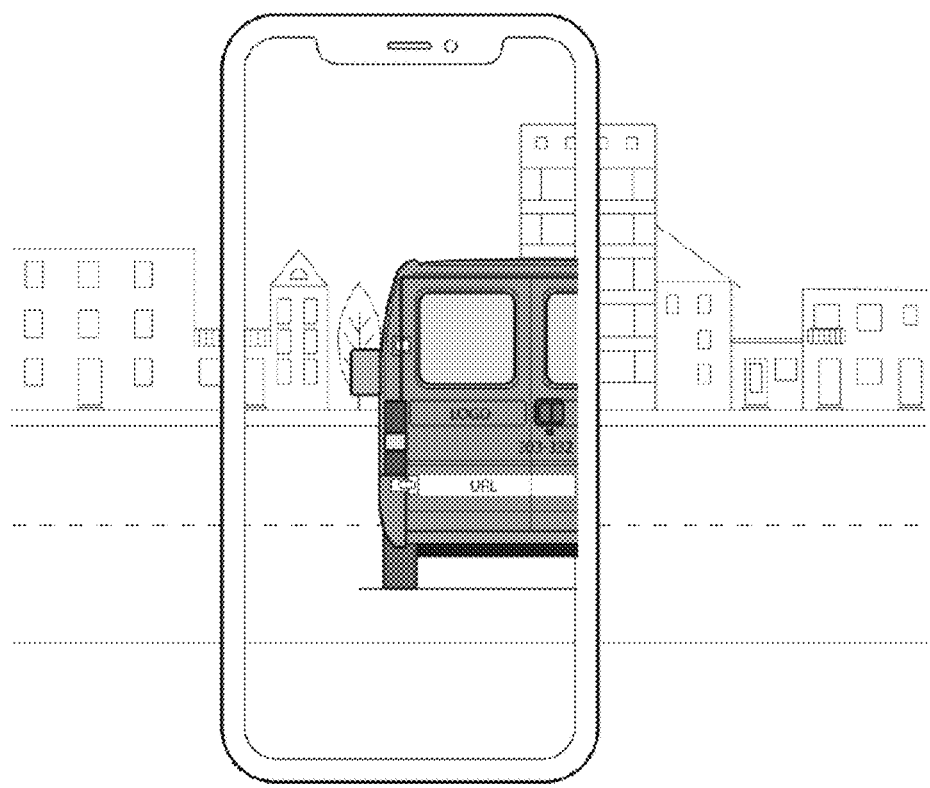
FIGS. 7A and 7B (collectively "FIG. 7") show a full digital mode for visualizing a wrap design generated by the disclosed system on a user device.
Figure 7B:
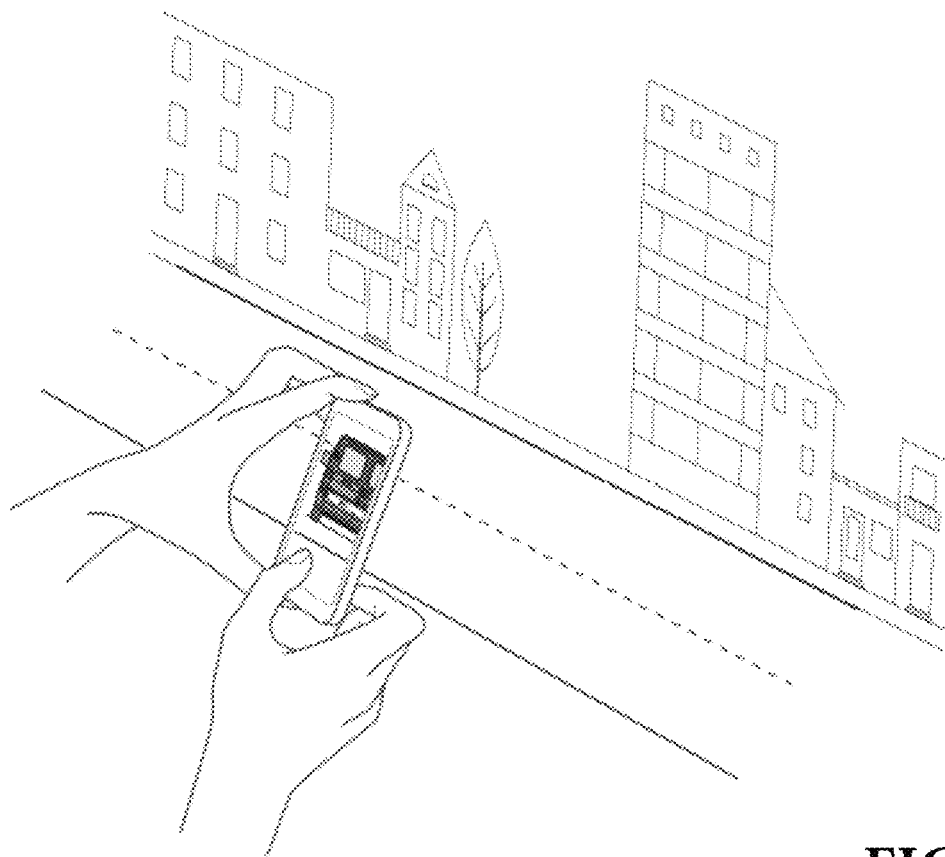

As shown in FIGS. 7A and 7B, a user can view a design in augmented reality. This functionality allows for a rendered wrap to be overlaid on a live video feed of the users surrounding captured by the user's device's camera, thus providing a more realistic representation of what a wrap would look like. Importantly, this flow involves the creation of a full digital vehicle asset that is not tied to any physical vehicle present in the field of vision of the device. This rendering is to be applied on a video feed where the focal point of the camera line of sight is a flat and empty surface. The user selects a specific vehicle out of a list of options provided to them. A design is then created following any of the above design flows.

The vehicle selection and design flow election can happen on the client side, and all asset creation can happen on the server side. After a design has been applied to a layout and the corresponding augmented reality asset has been created, it is transmitted back to the user device. The user device scans the field of vision of the camera and identifies any possible area matching placement criteria. The user selects a specific verified location and device pins the rendered design. User is then enabled to rotate and scale the vehicle via input on the device. Following placement, the user is enabled to move around in the real world and utilizing components of the device such as the camera, accelerometer, gyroscope, and magnetometer. The user viewpoint of the vehicle changes dynamically as if it were physically there in front of them.

Physical Vehicle Supported Mode

Figure 8A:
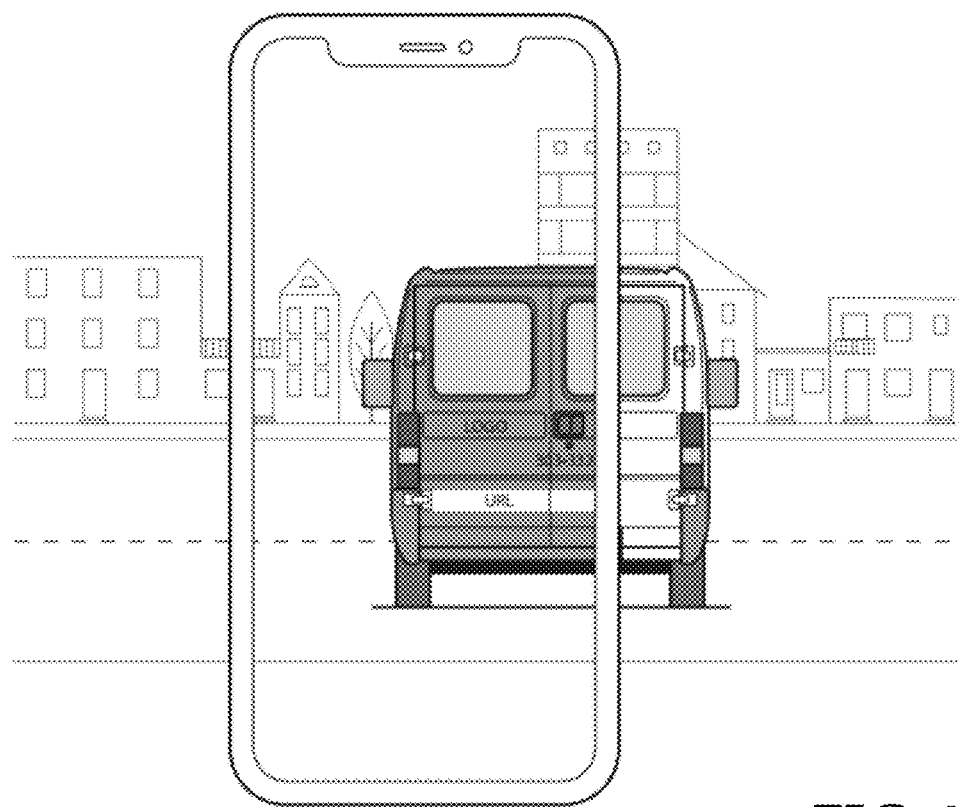
FIGS. 8A and 8B (collectively "FIG. 8") show a physical supported mode for visualizing a wrap design generated by the disclosed system on a user device.
Figure 8B:
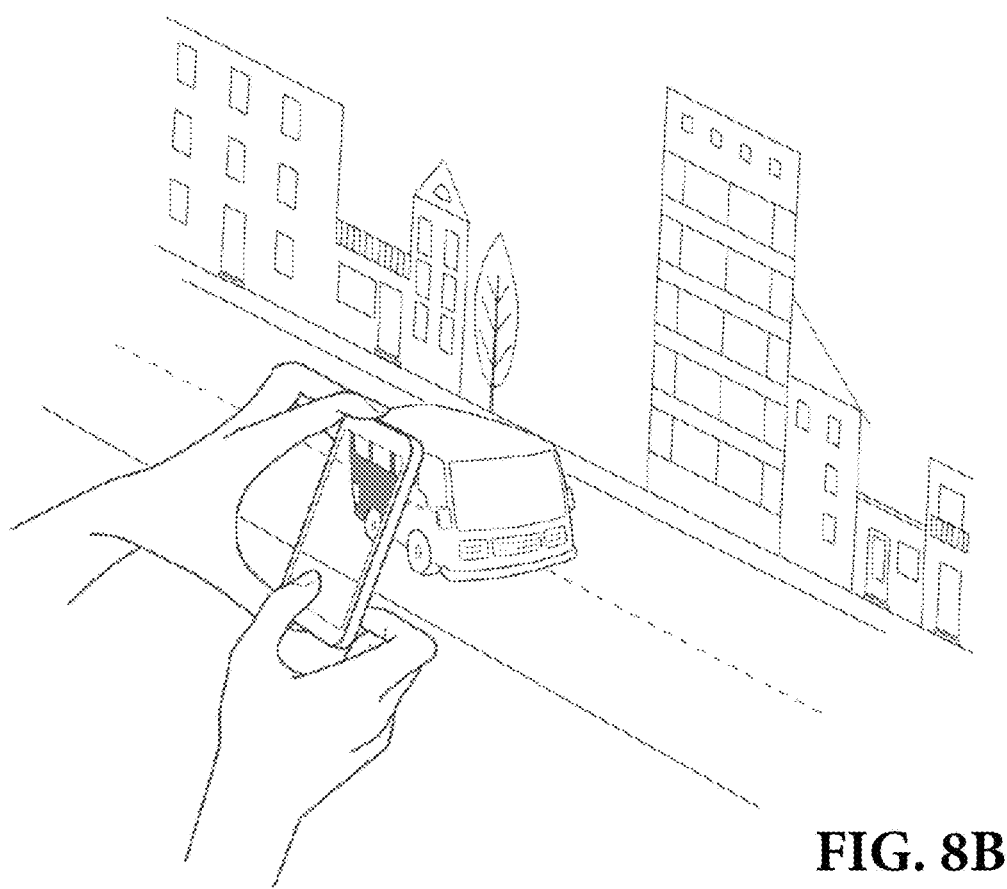

As shown in FIGS. 8A and 8B, the system provides a second augmented reality experience allowing users the ability to overlay a rendered wrap design on a vehicle present in the real world. This allows a user to see what a unique design could look like on a specific and real vehicle. The user envelopes their vehicle within the field of vision of the onboard camera of the user device. Using computer vision, it is determined if a vehicle is within the field of vision of the device. If one or more vehicles are in the field of view device overlays an outline on an assumed vehicle to inform the user of the target. If the target is incorrect, the user may move their device, so that the intended vehicle is selected. The user may be instructed to walk 360 degrees around the selected vehicle. The user device captures all required data via hardware components to create a complete vehicle template for subject vehicle.

Computer vision can be utilized to determine the surfaces that can or cannot be wrapped. For example, the vehicles tires, windshield and front windows, specific trim pieces, headlights, taillights, sideview mirror glass, and other areas cannot have a graphic placed on them. The user selects how they would like their design created, for example, by either utilizing the Data and Design Engines or creating their own design in the studio. The system transmits completed design to a user device. The created design is overlaid on a portion of a physical vehicle within the field of vision of the user device camera. As the user moves around the physical vehicle, the appropriate portion of the created layout is overlaid on the physical vehicle. Following placement, the user is enabled to move around in the real world and utilizing components of the device such as the camera, accelerometer, gyroscope, and magnetometer. The user's viewpoint of the vehicle changes dynamically as if it were physically there in front of them.

Transacting

At the end of the workflow, customers will be empowered to transact on their final graphic, as shown in FIGS. 6A and 6B. If the customer chooses to do so, all logistics and payment will be covered, and the work order will be completed.

AI-Metadata

The entire system has been designed such that it can find trends in customer behavior and design actions the system has taken. For example, if a statistically significant portion of recipients transacted on designs utilizing blurring in the background but little to no other overlap the system will associate that trend with transactions and will begin utilizing it in more designs. Conversely, if the system notices a trend of customers not transacting on designs that include a specific color on design elements, it will associate the with the color and limit its utilization. This methodology is also utilized in the Marketing Engine, which, as an example, can look at trends in outreach types (e.g., direct mail, email, digital marketing) and customer choices. The intention of this workflow is to constantly identify friends in customer behavior and correlate them with specific design choices made by every aspect of the system to maximize its effectiveness.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

III. DEFINITIONS

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

It is noted here that, as used in this specification and the appended claims, the singular forms "a," "an," and "the" include plural reference unless the context clearly dictates otherwise.

The terms "including," "comprising," "containing," or "having" and variations thereof are meant to encompass the items listed thereafter and equivalents thereof as well as additional subject matter unless otherwise noted.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

The word "substantially" does not exclude "completely," e.g., a composition which is "substantially free" from Y may be completely free from Y. Where necessary, the word "substantially" may be omitted from the definition of the invention.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

Each publication, patent application, patent, and other reference cited herein is incorporated by reference in its entirety to the extent that it is not inconsistent with the present disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates, which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for automatically generating and delivering a marketing material comprising a vehicle wrap design, comprising:
   automatically identifying a plurality of potential customers from an internal database without them taking any action, who may be interested in receiving the marketing material comprising the vehicle wrap design;
   obtaining customer information corresponding to each of the potential of customers, wherein the customer information is obtained from a website of each of the potential customers and wherein the customer information comprises company industry classification code and other information comprising business name, contact information, logo, URL, trademark, or slogan;
   generating automatically, without any action from the potential customers, a vehicle wrap design for covering a vehicle based on a pre-defined template of the vehicle, and directly placing the obtained customer information on the vehicle wrap design, and wherein the pre-defined template of the vehicle is identified based on an industry classification code associated with the each of the potential customers;
   generating, using the computing device, a three-dimensional rendering of the vehicle;
   applying the vehicle wrap design to the three-dimensional rendering of the vehicle to generate a three-dimensional rendering with the applied vehicle wrap; and
   causing a client device of at least one of the potential customers to display the marketing material comprising the three-dimensional rendering with the applied vehicle wrap.

2. The method of claim 1, wherein generating the vehicle wrap design and the three-dimensional rendering of the vehicle is performed at a server device and the method further comprises transmitting the vehicle wrap design or the three-dimensional rendering of the vehicle to the client device.

3. The method of claim 1, comprising preprocessing the customer information before or after the customer information is included in the vehicle wrap design, wherein the preprocessing comprises color changing, cropping, rotating, scaling, smoothing, masking, merging, filtering, or flattening.

4. The method of claim 1, further comprising generating, using the computing device, the vehicle wrap design for covering the vehicle based on the obtained customer information wherein the vehicle is identified from an image captured at the client device.

5. The method of claim 1, wherein the vehicle wrap design comprises unique contact information for assessing the effectiveness of the vehicle wrap design and the unique contact information is different from the contact information of the entity.

6. The method of claim 5, further comprising assessing the effectiveness of the vehicle wrap design based on the number of contacts made through the unique contact information over a predetermined period of time.

7. The method of claim 1, wherein generating the vehicle wrap design comprises:
   determining whether web content of the website includes a background; and
   when the web content includes a background:
      determine if an image is identifiable from the web content; and when an image is identifiable:
  integrate the image within the background; and
  verify that a contrast ratio between the background and the image is at an acceptable threshold.

8. The method of claim 1, further comprising delivering the vehicle wrap design to the entity via direct mail, email, or marketing.

9. The method of claim 1, further comprising:
  receiving user interactions at the client device while the three-dimensional rendering with the applied vehicle wrap is displayed at the client device; and
  modifying the vehicle wrap design based on the user interactions.

10. The method of claim 1, wherein causing the three-dimensional rendering with the applied vehicle wrap to be displayed at a client device comprises: while capturing an image at the client device, superimposing the vehicle wrap design over at least a portion of the image.

11. The method of claim 10, further comprising causing the client device to display a quote for production or installation cost of the vehicle wrap design.

12. A system for generating and delivering a marketing material comprising a vehicle wrap design, comprising:
  at least one computing device to:
  automatically identify a plurality of potential customers from an internal database without them taking any action, who may be interested in receiving the marketing material comprising the vehicle wrap design;
  obtain customer information corresponding to each of a plurality of potential customers wherein the customer information is obtained from a website of each of the potential customers and wherein the customer information comprises company industry classification code and other information comprising business name, contact information, logo, URL, trademark, or slogan;
  generate automatically, without any action from the potential customers, a vehicle wrap design for covering a vehicle based on a pre-defined template of the vehicle, and directly placing the obtained customer information on the vehicle wrap design, and wherein the pre-defined template of the vehicle is identified based on an industry classification code associated with the each of the potential customers;
  generate a three-dimensional rendering of the vehicle;
  apply the vehicle wrap design to the three-dimensional rendering of the vehicle to generate a three-dimensional rendering with the applied vehicle wrap; and
  cause a client device of at least one of the potential customers to display the marketing material comprising the three-dimensional rendering with the applied vehicle wrap.

13. The system of claim 12, wherein the vehicle is identified from an image captured at the client device.

14. The system of claim 12, wherein the vehicle wrap design comprises unique contact information for assessing the effectiveness of the vehicle wrap design and the unique contact information is different from the contact information of the entity.

15. The method of claim 14, further comprising assessing the effectiveness of the vehicle wrap design based on the number of contacts made through the unique contact information over a predetermined period of time.

16. The system of claim 12, wherein to generate the vehicle wrap design comprises:
  determining whether the web content includes a background; and
  when the web content includes a background:
    determining if an image is identifiable from the web content; and
    when an image is identifiable:
      integrating the image within the background; and
      verifying that a contrast ratio between the background and the image is at an acceptable threshold.

17. The system of claim 12, wherein the at least one processing device is further configured to:
  receive user interactions at the client device while the three-dimensional rendering with the applied vehicle wrap is displayed at the client device; and
  modify the vehicle wrap design based on the user interactions.

18. The system of claim 12, wherein to cause the three-dimensional rendering with the applied vehicle wrap to be displayed at a client device comprises: while capturing an image at the client device, superimposing the vehicle wrap design over at least a portion of the image.

19. A non-transitory computer-readable medium encoded with instructions, the instructions executable by one or more processing devices to automatically generate and deliver a marketing material comprising a vehicle wrap design that is unique to a potential customer, comprising:
  automatically identifying a plurality of potential customers from an internal database without them taking any action, who may be interested in receiving the marketing material comprising the vehicle wrap design;
  obtaining customer information corresponding to each of the potential of customers, wherein the customer information is obtained from a website of each of the potential customers and wherein the customer information comprises company industry classification code and other information comprising business name, contact information, logo, URL, trademark, company industry classification code or slogan;
  generating automatically, without any action from the potential customers, a vehicle wrap design for covering a vehicle based on a pre-defined template of the vehicle, and directly placing wherein the vehicle wrap design comprises the obtained customer information on the vehicle wrap design, and wherein the pre-defined template of the vehicle is identified based on an industry classification code associated with the each of the potential customers;
  generating, using the computing device, a three-dimensional rendering of the vehicle;
  applying the vehicle wrap design to the three-dimensional rendering of the vehicle to generate a three-dimensional rendering with the applied vehicle wrap; and
  causing a client device of at least one of the potential customers to display the marketing material comprising the three-dimensional rendering with the applied vehicle wrap.

20. The non-transitory computer-readable medium of claim 19, wherein the generating the vehicle wrap design comprises:
  determining whether the web content includes a background; and
  when the web content includes a background:
    determine if an image is identifiable from the web content; and when an image is identifiable:
- integrate the image within the background; and
- verify that a contrast ratio between the background and the image is at an acceptable threshold.

21. The non-transitory computer-readable medium of claim 20, further comprising:
- receiving user interactions at the client device while the three-dimensional rendering with the applied vehicle wrap is displayed at the client device; and
- modifying the vehicle wrap design based on the user interactions.

22. The non-transitory computer-readable medium of claim 19, wherein causing the three-dimensional rendering with the applied vehicle wrap to be displayed at a client device comprises: while capturing an image at the client device, superimposing the vehicle wrap design over at least a portion of the image.

* * * * *